June 6, 1950 — H. R. GREENLEE — 2,510,469
TRANSMISSION
Filed Jan. 11, 1945
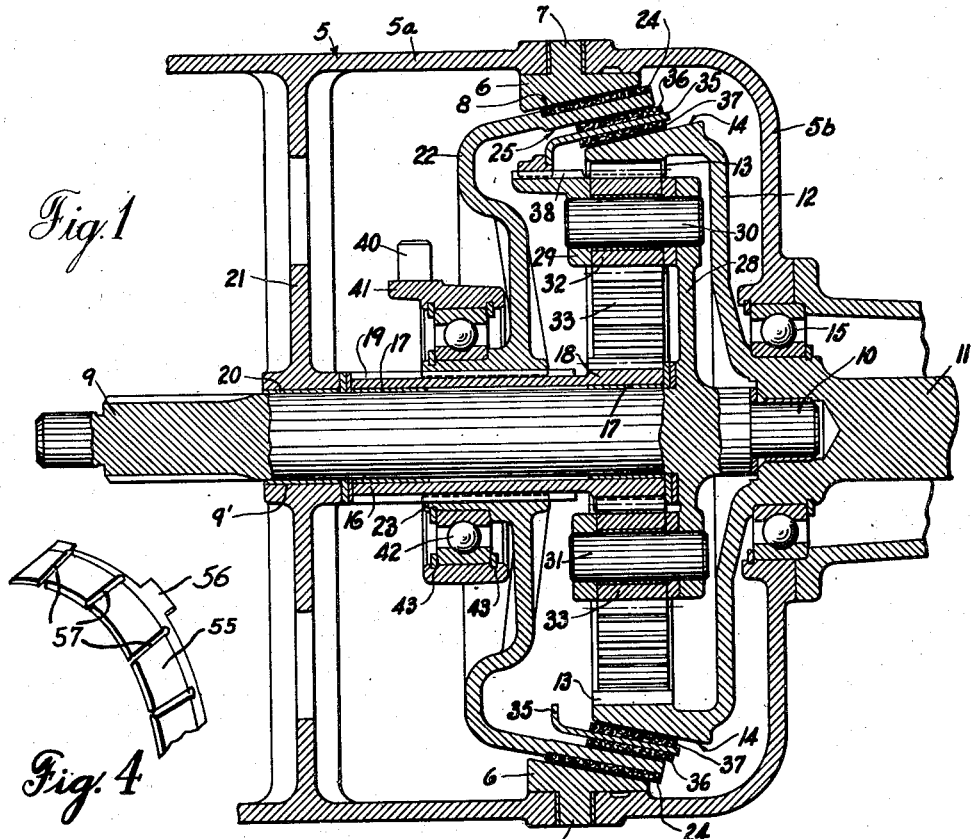
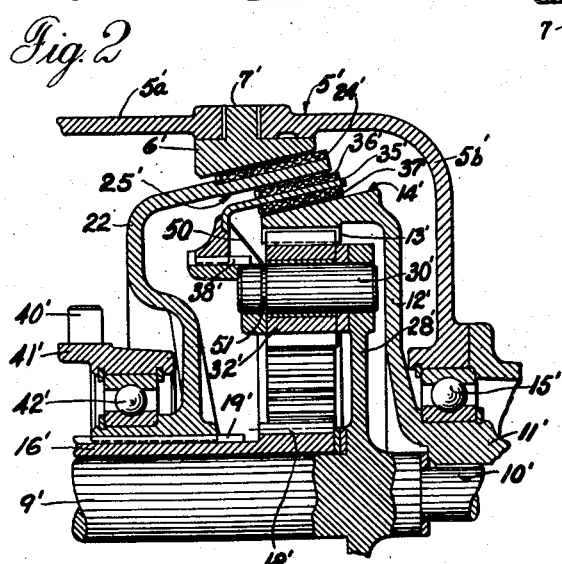
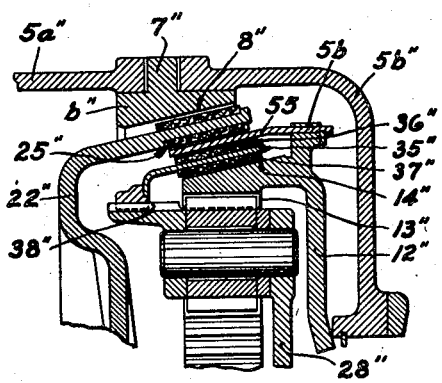
INVENTOR.
Harry R. Greenlee
BY
ATTORNEYS Patented June 6, 1950

2,510,469

UNITED STATES PATENT OFFICE 2,510,469

TRANSMISSION

Harry R. Greenlee, Indianapolis, Ind., assignor to The Studebaker Corporation, South Bend, Ind., a corporation of Delaware Application January 11, 1945, Serial No. 572,357

13 Claims. (Cl. 74—781)

This invention relates, in general, to transmissions, and has particular relation to a transmission including an improved cone clutch and brake adapted for automotive apparatus.

While the particular device which I shall describe hereinafter in connection with the drawing combines the improved clutch and brake with planetary gearing between the drive and driven members, it is to be understood that the clutch and brake of the present invention is not limited to the particular combination shown and described but may be employed otherwise as suitable and desired.

Some form of clutch or coupling which will slip is required in most of the applications of the combustion engine. For example, in road and rail vehicles and in tractors with geared drive the engine must be disconnected from the drive wheels while being started, and after starting, must be connected to the wheels or drive members by a device which may be so controlled by the operator that the torque load will not exceed the engine torque, so as to prevent stalling. Such a device is needed also when changing gears, as gears cannot be shifted while under load. A friction clutch is generally used for this purpose.

Heretofore, where a cone clutch and brake has been employed, as shown in the drawing, it has been customary to use any two torque transmitting members thereof, one, for example, on the planetary arm, and the other connected to the sun gear, and to move one of these members into and out of direct clutching engagement with the other member to provide direct and planetary connections between the drive and driven members.

The prior art devices of this character are of relatively limited clutching capacity for a device of given size. In order to increase the clutching capacity of such devices it has been necessary either to increase the size of the device, or to decrease the included cone clutch angle. A size change increases the amount of material involved, as well as the weight and cost of the device, and is otherwise frequently undesirable. An increase in the size of the device makes it unadaptable or less adaptable where the space is restricted, and increased weight in the clutch puts additional weight, for example, on the rear axle or connected parts as unsprung weight. A change in angle limits the smoothness of engagement of the clutch.

One of the main objects of the present invention is to provide an improved form of clutch having increased and, more particularly, multiple capacity for a given diameter.

Another object of the invention is to provide, in conjunction with a pair of torque transmitting members having driving relation in which one of the members is driven by the other member, an intermediate torque transmitting member disposed between and having engagement with both the first mentioned torque transmitting members in the driving relation thereof whereby the clutching capacity of the device is increased.

Another object of the invention is to provide an intermediate torque transmitting member which is engaged with both of the first mentioned torque transmitting members by movement of one of such first members into driving relation relative to the other member.

Another object of the invention is to provide means for moving the intermediate torque transmitting member out of engagement with one of the first mentioned torque transmitting members when the other torque transmitting member is separated therefrom.

Another object of the invention is to support the intermediate torque transmitting member for axial shifting movement, and held against turning movement, for example, relative to the member on which it is supported.

Another object of the invention is to provide in conjunction with a sun gear, ring gear, planet pinions between the sun gear and ring gear, and a planetary arm for supporting the planet pinions, a torque transmitting member, fixed against turning movement relative to the sun gear and having axial shifting movement relative to such gear, an intermediate torque transmitting member disposed between the ring gear and the first mentioned torque transmitting member and held on the planetary arm against turning relative thereto and for operation into and from direct driving relation between the ring gear and the first mentioned torque transmitting member.

Another object of the invention is to provide a device of the class described in which the parts are unified in direct drive relation and in which the thrust bearing loads are reduced as the clutch capacity increases.

Another object of the invention is to provide, particularly where a two stage hydraulic application is used and the final drive is taken through an L. G. S. or helical spring clutch, a device in which there is no objectionable reaction on the teeth of the gears in direct drive position and in which the bearing loads are reduced and effectively distributed; also a series of couplings for the respective members of a planetary gear set to prevent brinelling of the bearings of the adjacent members.

Another object of the invention is to provide a feathering of at least two members before the engagement of the other member or members.

Another object of the invention is to provide for wear which is compensated for by increasing diameter of clutch elements in ratio to the relative speeds between said elements.

Further objects and advantages of the invention will appear from the following detailed description, taken in connection with the accompanying drawing which illustrates the manner of constructing and operating one form of device embodying the present invention.

In the drawing:

Figure 1 is a fragmentary vertical longitudinal sectional view through a clutch embodying the present invention;

Figure 2 is a fragmentary part of a view similar to Figure 1 showing means for disengaging the intermediate torque transmitting member from the clutch surface of the ring gear upon movement of the other torque transmitting member away from the ring gear;

Figure 3 is a fragmentary part of a view similar to Figure 1 snowing another form of multiple clutch having triple capacity; and Figure 4 is a detail fragmentary perspective view of one of the torque transmitting members of the embodiment of Figure 3.

With reference now to the drawing, in the particular embodiment of the invention selected for illustration, 5 designates the gear housing between contiguous sections 5a and 5b of which a cone brake member 6 is fixedly secured, for example, at 7. The cone brake member 6 has an internal cone brake surface 8.

The drive shaft 9 enters the housing 5 through an opening 9' and is piloted at 10 in the adjacent end of the driven shaft 11. Formed integral with the driven shaft 11 is a torque transmitting member 12 having an internal ring gear 13 and an external cone clutch surface 14. The driven shaft 11 is journaled in a bearing 15 carried by the housing 5.

A sleeve 16 is journaled on the drive shaft 9, for example, by bushings 17. The sleeve 16 has a sun gear 18 and external longitudinal splines 19. A bushing 20 may be provided where the drive shaft 9 is journaled in the wall 21 of the housing 5.

A second torque transmitting member 22 is fixed against turning movement relative to the sun gear 18 by splined engagement at 23 with the splines 19 on the sleeve 16. The splined engagement at 23 permits axial shifting movement of the member 22 along the sleeve 16 and relative to the sun gear 18. The torque transmitting member 22 has an external cone brake surface 24, for engagement with the cone brake surface 8 of the fixed cone brake member 6, and an internal cone clutch surface 25. The cone brake surface 24 is preferably formed by suitable friction material, as shown in the drawing.

A planetary arm 28 is formed integral with the drive shaft 9, and the arm 28, with a part 29, carries pins 30 and 31. Planet pinions 32 are rotatably mounted on the pins 30 (only one of which is shown, to simplify the illustration) and mesh with the ring gear 13. Planet pinions 33 are rotatably mounted on the pins 31 (only one of which is shown). The planet pinions 33 mesh with the pinions 32 and with the sun gear 18 to provide a planetary drive, as well understood in the art. Other forms of planetary or epicyclic gearing may, of course, be employed between the drive and driven shafts within the scope of the present invention.

An intermediate torque transmitting member 35 is disposed between the torque transmitting members 22 and 12, and has external and internal cone clutch surfaces of friction material at 36 and 37 for engagement with the cone clutch surfaces 25 and 14, respectively. The member 35 is carried by and has splined engagement at 38 with an outstanding flange on the part 29 carried by the planetary arm 28. The splined engagement at 38 holds the intermediate torque transmitting member 35 against turning relative to the planetary arm 28 and, at the same time, permits longitudinal or axial movement of the member 35 relative to the torque transmitting member 12.

The torque transmitting member 22 is shifted axially or longitudinally along the sleeve 16, for example, by cooperation of suitable shifter means (not shown) with a pin 40 on a shifter collar 41. The shifter collar 41 is held to the member 22 and against axial or longitudinal movement relative thereto, for example, by a bearing 42 and suitable retainer rings 43.

The device operates, in general, as follows:

If the engine or other source of power is operating to turn the drive shaft 9 and the intermediate torque transmitting member 35 is in its intermediate position out of clutching engagement with the members 22 and 12, the device is in neutral, assuming, of course, that the member 22 is out of engagement with the fixed brake member 6.

Ratio or underdrive is imparted from the drive shaft 9 to the driven shaft 11 by manipulating or operating the shifter mechanism in a manner to shift the torque transmitting member 22 to the left, as the device is viewed in Figure 1, to bring the cone brake surface 24 thereof into braking engagement with the fixed cone brake surface 8. This locks the torque transmitting member 22 and thereby the sun gear 18 against rotation, and, as a result, ratio drive is imparted to the driven shaft 11 through the operation of the planetary gearing about the sun gear 18.

When direct or one-to-one drive is desired, the shifter mechanism is operated to shift the torque transmitting member 22 from neutral position, as shown in the drawing, to the right. In its movement toward the member 12, the member 22 engages and moves the intermediate torque transmitting member 35 to the right until its inner clutch surface 37 is in clutching engagement with the external clutch surface 14 of the member 12 and its external clutch surface 36 is in clutching engagement with the internal clutch surface 25 of the member 22. With the parts so positioned, the members 22, 35, and 12 are locked together and provide direct or one-to-one drive from the drive shaft 9 to the driven shaft 11.

The intermediate torque transmitting member 35, by having clutching engagement with both of the members 22 and 12, materially increases and, in fact, in the illustrated embodiment of the invention, substantially doubles the area of the effective clutch surfaces. This, in turn, materially increases and, in fact, in the illustrated embodiment of the invention, substantially doubles the capacity of the clutch without any material increase in the weight, size, or cost of the clutch.

With the drive in direct or one-to-one relation, the parts are unified. Moreover, particularly where a two stage hydraulic application is used and the final drive is through an L. G. S. or helical spring clutch, there is no objectionable reaction on the teeth of the gears in direct drive position, and the bearing loads are reduced and effectively distributed; also a series of couplings for the respective members of a planetary gear set are provided to prevent brinelling of the bearings of the adjacent members.

In the embodiment of the invention shown in Figure 1, the intermediate torque transmitting member 35 is released or breaks loose from the member 12 by the relative turning movement of the parts when the member 22 is shifted to released position.

Except for the additional provision to be presently described, the device shown in Figure 2 is the same as the device shown in Figure 1, and like parts are designated by primed reference characters corresponding to the reference characters used in Figure 1.

In the device of Figure 2, instead of relying on the relative turning movement of the parts to release or break the members 35' loose from the member 12', I provide a spring 50 for accomplishing this result. The spring 50 is shown in the form of an annular cone shaped spring interposed between the member 35' and a part on the planetary arm 28'. Engagement of the spring 50 in a circumferential groove 51 in the pin 30' illustrates one suitable form of engagement of the spring 50 with a part on the planetary arm 28'. By engagement of the groove 51, the spring 50 performs the additional function of holding the pin 30' in place and against accidental displacement from the arm 28'. Any other suitable form of spring or other means may be employed within the scope of the present invention for releasing the member 35' from the member 12' when the member 22' is shifted to disengaged position.

Except for the additional provision to be presently described, the device shown in Figure 3 is the same as the device shown in Figure 2, and like parts are designated by double primed reference characters corresponding to the reference characters used in Figure 2.

In the device of Figure 3 a second intermediate torque transmitting member 55 is disposed between the torque transmitting member 22" and intermediate torque transmitting member 35", and has external and internal cone clutch surfaces for engagement with the cone clutch surfaces 25" and 36" respectively. The cone clutch surfaces 25" and 36" are shown formed of suitable friction material. The second intermediate torque transmitting member 55 is carried, for example, at 56 by the torque transmitting member 12", and is held against turning movement relative to the member 12". The frusto-conical portion of member 55 is preferably provided with a plurality of slots 57 rendering it sufficiently resilient to be pressed into engagement with the cooperating external clutch surface of the member 35" and to follow the member 35" in its movement into clutching engagement with the member 12" upon movement of the torque transmitting member 22" to the right.

The two intermediate torque transmitting members 35" and 55 as shown in Figure 3, by having clutching engagement with each other and with the members 12" and 22" in direct or one-to-one drive, provide a multiple clutch having further increased, and particularly triple, capacity in the illustrated embodiment of this form of the invention.

As a further feature of the present invention, I contemplate provision for feathering any two of the cooperating cone clutch members, for example, before engagement of the other member or members. For example, by making the cooperating cone clutch surfaces 25 and 36 as shown in Figure 1, or 25' and 36' as shown in Figure 2, or 25" and 36" as shown in Figure 3, of different taper, and the difference in taper so disposed, the left hand ends of these cone clutch surfaces, as shown in the drawing, may, in neutral position, be closer together than the right hand ends. As a result, when the member 22, or the member 22', or the member 22", for example, is moved to the right from neutral position, the left hand ends of these cooperating cone clutch surfaces will engage first, and there will be a feathering of the cooperating clutch surfaces into engagement. This increases the smoothness of engagement of the cooperating members.

The embodiments of the invention shown in the drawing are for illustrative purposes only, and it is to be expressly understood that said drawing and the accompanying specification are not to be construed as a definition of the limits or scope of the invention, reference being had to the appended claims for that purpose.

I claim:

1. For use in a transmission having a drive shaft, a driven shaft, a sun gear journaled on said drive shaft, a planetary arm fixed to turn with the drive shaft, a ring gear fixed to turn the driven shaft therewith and having an external cone clutch surface, first planet pinions carried by said planetary arm and meshing with said ring gear, second planet pinions carried by said planetary arm and meshing with said sun gear and with said first planet pinions, and a housing, the combination of a first cone brake member fixed to said housing and having an internal cone brake surface, a cone clutch and brake member fixed against turning movement relative to said sun gear and having axial shifting movement relative to said sun gear, said cone clutch and brake member having an internal cone clutch surface; also an external cone brake surface for engagement with the internal cone brake surface of said first cone brake member, and an intermediate torque transmitting member disposed between said cone clutch and brake member and said ring gear and having external and internal cone clutch surfaces for engagement with the clutch surfaces of said cone clutch and brake member and said ring gear.

2. For use in a transmission having a drive shaft, a driven shaft, a sun gear journaled on said drive shaft, a planetary arm fixed to turn with the drive shaft, a ring gear fixed to turn the driven shaft therewith and having an external cone brake surface, first planet pinions carried by said planetary arm and meshing with said ring gear, second planet pinions carried by said planetary arm and meshing with said sun gear and with said first planet pinions, and a housing, the combination of a first cone brake member fixed to said housing and having an internal cone brake surface, a cone clutch and brake member fixed against turning movement relative to said sun gear and having axial shifting movement relative to said sun gear, said cone clutch and brake member having an internal cone clutch surface; also an external cone brake surface for engagement with the internal cone brake surface of said first cone brake member, and an intermediate torque transmitting member disposed between said cone clutch and brake member and said ring gear and having external and internal cone clutch surfaces for engagement with the clutch surfaces of said cone clutch and brake member and said ring gear, said intermediate torque transmitting member being shifted into clutching engagement with said cone clutch and brake member and the ring gear by shifting said cone clutch and brake member toward the ring gear, to lock the cone clutch and brake member, intermediate torque transmitting member and said ring gear together for direct drive.

3. In apparatus of the class described, in combination, a drive shaft, a driven shaft, a sun gear journaled on said drive shaft, a planetary arm fixed to turn with the drive shaft, a ring gear fixed to turn the driven shaft therewith and having an external cone clutch surface, a housing, a first cone brake member fixed to said housing and having an internal cone brake surface, first planet pinions carried by said planetary arm and meshing with said ring gear, second planet pinions carried by said planetary arm and meshing with said sun gear and with said first planet pinions, a cone clutch and brake member fixed against turning movement relative to said sun gear and having axial shifting movement relative to said sun gear, said cone clutch and brake member having an internal cone clutch surface; also an external cone brake surface for engagement with the internal cone brake surface of said first cone brake member, an intermediate torque transmitting member disposed between said cone clutch and brake member and said ring gear and having external and internal cone clutch surfaces for engagement with the clutch surfaces of said cone clutch and brake member and said ring gear, said intermediate torque transmitting member being shifted into clutching engagement with said cone clutch and brake member and the ring gear by shifting said cone clutch and brake member toward the ring gear to lock the cone clutch and brake member, intermediate torque transmitting member and said ring gear together for direct drive, and means on said planetary arm for supporting said intermediate torque transmitting member for axial shifting movement relative to said ring gear and holding said intermediate torque transmitting member against turning movement relative to said ring gear.

4. In apparatus of the class described, in combination, a drive shaft, a driven shaft, a sun gear journaled on said drive shaft, a planetary arm fixed to turn with the drive shaft, a ring gear fixed to turn the driven shaft therewith and having an external cone clutch surface, a housing, a first cone brake member fixed to said housing and having an internal cone brake surface, first planet pinions carried by said planetary arm and meshing with said ring gear, second planet pinions carried by said planetary arm and meshing with said sun gear and with said first planet pinions, a cone clutch and brake member fixed against turning movement relative to said sun gear and having axial shifting movement relative to said sun gear, said cone clutch and brake member having an internal cone clutch surface; also an external cone brake surface for engagement with the internal cone brake surface of said first cone brake member, an intermediate torque transmitting member disposed between said cone clutch and brake member and said ring gear and having external and internal cone clutch surfaces for engagement with the clutch surfaces of said cone clutch and brake member and said ring gear, said intermediate torque transmitting member being shifted into clutching engagement with said cone clutch and brake member and the ring gear by shifting said cone clutch and brake member toward the ring gear to lock the cone clutch and brake member, intermediate torque transmitting member and said ring gear together for direct drive, means on said planetary arm for supporting said intermediate torque transmitting member for axial shifting movement relative to said ring gear and holding said intermediate torque transmitting member against turning movement relative to said ring gear, and spring means for moving said intermediate torque transmitting member in the opposite direction to release same from said ring gear when the cone clutch and brake member is moved away from the ring gear.

5. In apparatus of the class described, in combination, a drive shaft, a driven shaft, a sun gear journaled on said drive shaft, a planetary arm fixed to turn with the drive shaft, a ring gear fixed to turn the driven shaft therewith and having an external cone clutch surface, a housing, a first cone brake member fixed to said housing and having an internal cone brake surface, first planet pinions carried by said planetary arm and meshing with said ring gear, second planet pinions carried by said planetary arm and meshing with said sun gear and with said first planet pinions, a cone clutch and brake member fixed against turning movement relative to said sun gear and having axial shifting movement relative to said sun gear, said cone clutch and brake member having an internal cone clutch surface; also an external cone brake surface for engagement with the internal cone brake surface of said first cone brake member, an intermediate torque transmitting member disposed between said cone clutch and brake member and said ring gear and having external and internal cone clutch surfaces for engagement with the clutch surfaces of said cone clutch and brake member and said ring gear, said intermediate torque transmitting member being shifted into clutching engagement with said cone clutch and brake member and the ring gear by shifting said cone clutch and brake member toward the ring gear to lock the cone clutch and brake member, intermediate torque transmitting member and said ring gear together for direct drive, means on said planetary arm for supporting said intermediate torque transmitting member for axial shifting movement relative to said ring gear and holding said intermediate torque transmitting member against turning movement relative to said ring gear, and spring means for moving said intermediate torque transmitting member in the opposite direction to release same from said ring gear when the cone clutch and brake member is moved away from the ring gear, said spring means being interposed between said intermediate torque transmitting member and means on said planetary arm.

6. For use with planetary gear means including a planetary arm, the combination of a first cone clutch member having an external cone clutch surface, a second cone clutch member having an internal cone clutch surface, an intermediate torque transmitting member adapted to be carried on said arm for longitudinal movement relative thereto and held against turning movement relative to said planetary arm, said intermediate torque transmitting member having internal and external cone clutch surfaces adapted for engagement with the clutch surfaces of said first and second cone clutch members, and said second cone clutch member being adapted to be shifted for effecting clutching engagement of said intermediate torque transmitting member with the clutch surfaces of said first and second cone clutch members.

7. For use in a transmission having gear means for providing a plurality of driving ratios between drive and driven shafts of the transmission, the combination of a pair of torque transmitting members adapted to be associated with said gear means, a third torque transmitting member adapted to be associated with said gear means and disposed between said pair of torque transmitting members for clutching engagement therewith to effect a first driving ratio between said shafts through said gear means, and one of said pair of torque transmitting means being operable to effect a second driving ratio between said shafts through said gear means.

8. For use in a transmission having a gear case, gear means disposed in said gear case for providing a plurality of driving ratios between the drive and driven shafts of the transmission, the combination of a pair of torque transmitting members adapted to be associated with said gear means, a clutch member adapted to be associated with said gear means disposed between said torque transmitting members for clutching engagement therewith to effect a first driving ratio between said shafts through said gear means, and brake means between one of said pair of torque transmitting members and said gear case operable to effect a second driving between said shafts through said gear means.

9. For use in a transmission comprising a housing, drive and driven shafts, planetary gear means comprising three elements, namely, a sun gear, planet pinion means, and a ring gear, one of said elements having connection with said drive shaft and a second of said elements having connection with said driven shaft, the combination of a first brake member fixed to said housing, a clutch and brake member fixed to the third element of said planetary gear means for rotation therewith and having axial shifting movement relative to said third element, said clutch and brake member having a clutch surface and a brake surface, said brake surface of said clutch and brake member being engageable with said brake member by axial movement of said clutch and brake member in one direction to brake said third element of said planetary gear means against rotation, and an intermediate torque transmitting member disposed between said clutch and brake member and said second of said elements of said planetary gear mechanism and having external and internal clutch surfaces for engagement with the clutch surface of said clutch and brake member and said second element of said planetary gear, respectively, upon axial movement of said clutch and brake member in a direction opposite the direction of movement thereof for engaging the brake surface of the latter with said brake member.

10. For use in a transmission comprising a housing, drive and driven shafts, planetary gear means comprising three elements, namely, a sun gear, planet pinion means, and a ring gear, one of said elements having connection with said drive shaft and a second of said elements having connection with said driven shaft, the combination of a first brake member fixed to the third element of said planetary gear means for rotation therewith and having axial shifting movement relative to said third element, said clutch and brake member having a clutch surface and a brake surface, said brake surface of said clutch and brake member being engageable with said brake member by axial movement of said clutch and brake member in one direction to brake said third element of said planetary gear means against rotation, an intermediate torque transmitting member disposed between said clutch and brake member and said second of said elements of said planetary gear mechanism and having external and internal clutch surfaces for engagement with the clutch surface of said clutch and brake member and said second element of said planetary gear, respectively, upon axial movement of said clutch and brake member in a direction opposite the direction of movement thereof for engaging the brake surface of the latter with said brake member, and spring means between said intermediate torque transmitting member and said one of said elements of said planetary gear means for normally urging said intermediate torque transmitting member in a direction to disengage said internal clutch surface thereof from said second element of said planetary gear means.

11. For use in a transmission comprising a housing, drive and driven shafts, planetary gear means comprising three elements, namely, a sun gear, planet pinion means, and a ring gear, one of said elements having connection with said drive shaft and a second of said elements having connection with said driven shaft, the combination of a first brake member fixed to the third element of said planetary gear means for rotation therewith and having axial shifting movement relative to said third element, said clutch and brake member having a clutch surface and a brake surface, said brake surface of said clutch and brake member being engageable with said brake member by axial movement of said clutch and brake member in one direction to brake said third element of said planetary gear means against rotation, and a pair of intermediate torque transmitting members disposed between said clutch and brake member and said second of said elements of said planetary gear means, said intermediate torque transmitting members having internal and external clutch surfaces, the internal clutch surface of one of said torque transmitting members having engagement with the external clutch surface of the other of said torque transmitting members, the external clutch surface of said one torque transmitting member having clutching engagement with the clutch surface of said clutch and brake member, and the external and internal clutch surfaces of said one and said other torque transmitting members, respectively, having clutching engagement with the clutch surfaces of said clutch and brake member and second element of said planetary gear means upon axial movement of said clutch and brake member in a direction opposite the direction of movement thereof for engaging the brake surface of the latter with said brake member.

12. For use in a transmission comprising a housing, drive and driven shafts, planetary gear means comprising three elements, namely, a sun gear, planet pinion means, and a ring gear, one of said elements having connection with said drive shaft and a second of said elements having connection with said driven shaft, the combination of a first brake member fixed to said housing, a clutch and brake member fixed to the third element of said planetary gear means for rotation therewith and having axial shifting movement relative to said third element, said clutch and brake member having a clutch surface and a brake surface, said brake surface of said clutch and brake member being engageable with said brake member by axial movement of said clutch and brake member in one direction to brake said third element of said planetary gear means against rotation, and a pair of intermediate torque transmitting members disposed between said clutch and brake member and said second of said elements of said planetary gear means, said intermediate torque transmitting members having internal and external clutch surfaces, the internal clutch surface of one of said torque transmitting members having engagement with the external clutch surface of the other of said torque transmitting members, the external clutch surface of said one torque transmitting member having clutching engagement with the clutch surface of said clutch and brake member, and the external and internal clutch surfaces of said one and said other torque transmitting members, respectively, having clutching engagement with the clutch surfaces of said clutch and brake member and second element of said planetary gear means upon axial movement of said clutch and brake member in a direction opposite the direction of movement thereof for engaging the brake surface of the latter with said brake member, said one torque transmitting member having connection with said third element of said planetary gear means, and said other of said torque transmitting members having connection with said second of said elements of said planetary gear means.

13. For use in a transmission comprising a housing, drive and driven shafts, planetary gear means comprising three elements, namely, a sun gear, planet pinion means, and a ring gear, one of said elements having connection with said drive shaft and a second of said elements having connection with said driven shaft, the combination of a first brake member fixed to said housing and having a frusto-conical brake surface, a clutch and brake member fixed to the third element of said planetary gear means for rotation therewith and having axial shifting movement relative to said third element, said clutch and brake member having an outer frusto-conical brake surface disposed inwardly of the frusto-conical brake surface of said first brake member, and an inwardly disposed substantially frusto-conical clutch surface, said brake surface of said clutch and brake member being engageable with the brake surface of said brake member by axial movement of said clutch and brake member in one direction to brake said third element of said planetary gear means, and intermediate torque transmitting means disposed between said clutch and brake member and said second of said elements of said planetary gear means and having an external frusto-conical clutch surface disposed inwardly of the clutch surface of said clutch and brake means and an internal frusto-conical clutch surface, said second element of said planetary gear means having a substantially frusto-conical clutch surface disposed inwardly of the internal clutch surface of said intermediate torque transmitting means, said brake and clutch surfaces of said first brake member, said clutch and brake member, said intermediate torque transmitting means, and said second element of said planetary gear means all extending angularly in substantially the same direction, said external and internal clutch surfaces of said torque transmitting means having engagement with the clutch surface of said clutch and brake member and with said second element of said planetary gear means, respectively, upon axial movement of said clutch and brake member in a direction opposite the direction of movement thereof for engaging the brake surface of the latter with the brake surface of said brake member.

HARRY R. GREENLEE.

REFERENCES CITED

The following references are of record in the file of this patent:

UNITED STATES PATENTS

| Number | Name | Date |
|---|---|---|
| 810,783 | Maxwell | Jan. 23, 1906 |
| 814,132 | Hele-Shaw | Mar. 6, 1906 |
| 923,613 | Atwood | June 1, 1909 |
| 940,970 | Hovey et al. | Nov. 23, 1909 |
| 1,257,627 | Mitchella | Feb. 26, 1918 |
| 2,069,408 | Forichon | Feb. 2, 1937 |
| 2,136,971 | Fleischel | Nov. 15, 1938 |
| 2,251,367 | Miller | Aug. 5, 1941 |
| 2,308,547 | Schneider | Jan. 19, 1943 |
| 2,318,481 | Greenlee | May 4, 1943 |
| 2,339,643 | Tourneau | Jan. 18, 1944 |
| 2,341,747 | Vincent | Feb. 15, 1944 |
| 2,350,411 | Nabstedt | June 6, 1944 |

FOREIGN PATENTS

| Number | Country | Date |
|---|---|---|
| 11,245 | Great Britain | Aug. 2, 1892 |
| 456,007 | Great Britain | Nov. 2, 1936 |
| 63,375 | Germany | July 16, 1892 |
| 191,045 | Germany | Dec. 28, 1907 |